United States Patent [19]

Boyles

[11] 4,456,085

[45] Jun. 26, 1984

[54] WEIGHING SCALE

[75] Inventor: Robert L. Boyles, Milford, Conn.

[73] Assignee: General Electric Company, New York, N.Y.

[21] Appl. No.: 382,177

[22] Filed: May 26, 1982

[51] Int. Cl.$^3$ .............................................. G01G 21/08
[52] U.S. Cl. .............................. 177/256; 177/DIG. 9
[58] Field of Search ............... 177/208, 211, 256, 257, 177/DIG. 9

[56] References Cited

U.S. PATENT DOCUMENTS

| | | | |
|---|---|---|---|
| 3,164,218 | 1/1965 | McClimon | 177/208 X |
| 3,465,838 | 9/1969 | Kienzle et al. | 177/256 |
| 3,853,191 | 12/1974 | Yamagiwa | 177/210 |

Primary Examiner—George H. Miller, Jr.
Attorney, Agent, or Firm—George R. Powers; John F. Cullen; Leonard J. Platt

[57] ABSTRACT

A weighing scale of the household type includes a base, a platform vertically positioned above the base, and a force transmitting means therebetween. The force transmitting means includes relative large surface area planar bearing surfaces on the base and platform for mating contact with bearing surfaces on levers for transmitting force to a weight sensing means. The bearing arrangement permits substantial misalignments of scale components since the planar bearing surfaces do not establish the moment arms of the force transmitting means.

8 Claims, 6 Drawing Figures

WEIGHING SCALE

BACKGROUND OF THE INVENTION

1. Field of the Invention

This invention relates to weighing scales and, more particularly, to household weighing scales in which significant misalignment of the scale components can occur without affect on the weighing accuracy.

2. Description of the Prior Art

Weighing scales of the relatively inexpensive household type normally include vertically spaced-apart base and platform members and a force transmitting means between the platform and the base for converting a total weight force applied to the platform into a force related to and thereby indicating the actual weight. In practice, the force transmitting means typically includes various levers cooperating with complementary bearing surfaces on the platform and base members. More particularly, the levers and the platform and base members are commonly provided with complementary V-shaped slots and knife edges which cooperate with the slots to provide the bearing surfaces and, at the same time, to establish predetermined moment arms for assuring that the applied weight is translated into a properly related weight indicating force.

In such prior art weighing systems, it is essential that the levers and base and platform members be accurately aligned with each other so that the mating elements will fit together properly without binding or otherwise distorting the moment arms established by the elements. If dimensional accuracy is not maintained within acceptable limits, the scale may not operate or, at the very least, the indicated weight may be outside of the acceptable range of accuracy. As a result, it is essential that all of the various elements be manufactured to relatively low tolerance ranges in order to assure that they will be aligned properly when the scale is assembled. The holding of fine tolerances on all parts, particularly large plastic base and platform members, in order to minimize tolerance build-ups tends to increase manufacturing complexity, waste, and cost. It would be ideal if accuracy could be maintained without requiring that tolerance build-ups remain small.

SUMMARY OF THE INVENTION

It is therefore a primary object of this invention to provide a weighing scale in which significant misalignment of parts can occur without adversely affecting operating and weighing accuracy.

Another object of this invention is to provide a weighing scale in which the base and platform members can be manufactured to relatively low tolerance levels.

Yet another object of this invention is to provide in a weighing scale of the household type an improved mechanism which does not require accurate alignment of the base and platform members.

Briefly stated, in carrying out the invention in one form, a weighing scale having horizontally disposed, vertically spaced-apart base and platform members is provided with force transmitting means for transmitting force between the platform and base members. The force transmitting means includes at least one upwardly facing horizontal planar bearing surface on the base and at least one downwardly facing horizontal planar surfaces on the platform. At least one lever is provided between the planar bearing surfaces, the lever including first and second bearing surfaces projecting vertically therefrom into contact with the respective planar surfaces. The first and second bearing surfaces are horizontally spaced-apart by a distance fixed within normal manufacturing tolerances, and the horizontal planar surfaces of the base and platform members are horizontally spaced-apart by a distance roughly comparable to the spacing between the first and second bearing surfaces. The surface areas of the planar bearing surfaces are large relative to the contacting surface areas of the first and second bearing surfaces such that significant horizontal misalignment can occur between the base and platform members without effect on the forces and moments transmitted by the lever.

In accordance with further aspects of the invention, the first and second bearing surfaces are V-shaped projections providing essentially line contact between each of the first and second bearing surfaces and the respective one of the horizontal planar bearing surfaces. The weighing scale apparatus further comprises weight sensing means for converting a total force applied to the scale into an indication of the weight applied to the scale. The lever is an elongated member disposed in a generally horizontal plane with the first and second bearing means located adjacent one end thereof, and the lever further includes a third bearing surface adjacent the other end of the lever. The third bearing surface transmits force to the weight sensing means in response to forces applied to the first and second bearing surfaces as a result of a weight being applied to the platform. The third bearing surface is spaced-apart from the first and second bearing surfaces by a distance fixed within normal manufacturing tolerances to assure that the force transmitted to the weight sensing means will be related in a known manner to the forces applied to the first and second bearing surfaces.

By still further aspects of the invention, the force transmitting means includes a plurality of levers each extending from a separate peripheral portion of the overlying base and platform members to a common central portion thereof. The ends of the levers including the third bearing surfaces and the weight sensing means are located at the central portion, and the third bearing surfaces transmit to the weight sensing means a total force related in a known manner to the total weight applied to the platform member. The weight sensing means is secured to a selected one of the base and platform members in a fixed location relative thereto, whereby the third bearing surfaces are fixed in positions established by the weight sensing means. The planar bearing surfaces permit the positions of the first and second bearing surfaces to vary with respect to the base and platform members without affecting the forces and moments transmitted by the levers.

BRIEF DESCRIPTION OF THE DRAWINGS

While the novel features of this invention are set forth with particularity in the appended claims, the invention, both as to organization and content, will be better understood and appreciated, along with other objects and features thereof, from the following description taken in connection with the drawings, in which:

DESCRIPTION OF A PREFERRED EMBODIMENT

Figure 1:
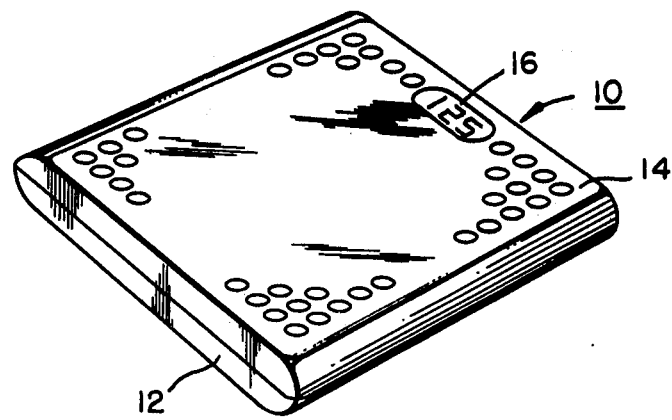
FIG. 1 is a perspective view of a household-type weighing scale incorporating the bearing arrangement of this invention.

As illustrated by FIGS. 1 through 4, a household-type weighing scale 10 includes a generally horizontal base member 12 and a generally horizontal platform member 14 positioned vertically above the base member 12. A force transmitting mechanism is interposed between the base member 12 and the platform member 14 for transmitting force therebetween whenever a weight is placed on the upper surface of the platform member 14. The force transmitting mechanism, which will be described in detail as this description proceeds, maintains at all times a slight vertical spacing, as at 18, between all directly facing portions of the base and platform members so that downwardly directed force applied to the platform 14 can be transmitted from the platform 14 to the base 12 only through the force transmitting mechanism. The scale includes means for sensing the magnitude of the force, or weight, applied to the platform 14 and displaying the applied weight by means of a digital display 16 which may be viewed through an opening in the platform member 14.

Figure 2:
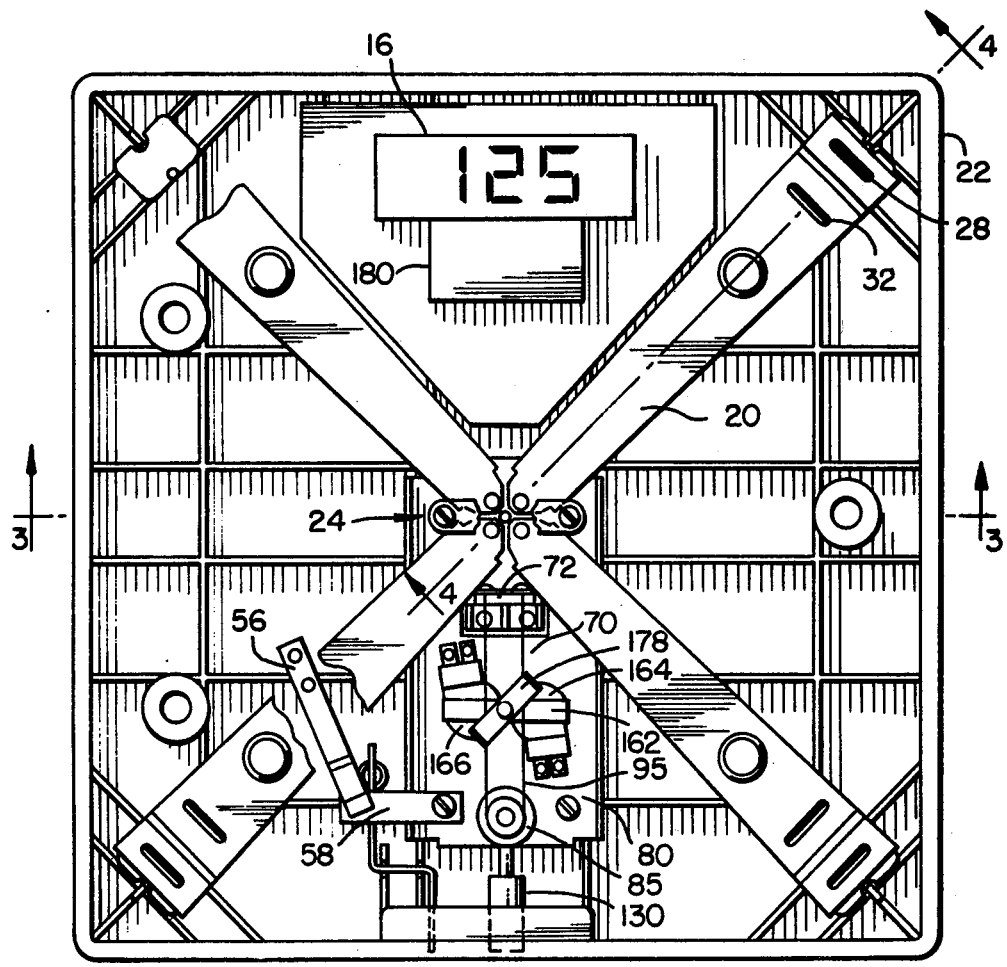
FIG. 2 is a top view of the weighing scale of FIG. 1 with the platform member removed.
Figure 3:
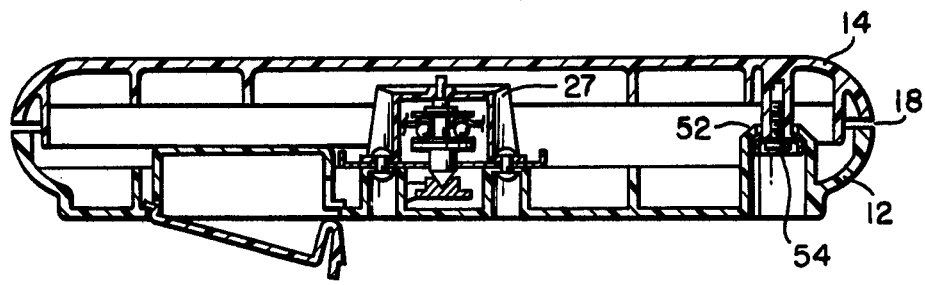
FIG. 3 is a cross-sectional view of the scale taken along viewing line 3—3 of FIG. 2.
Figure 4:
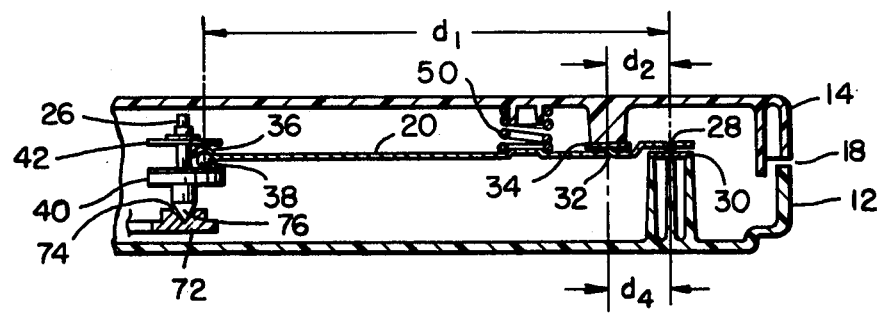
FIG. 4 is a cross-sectional view of one of the levers and a portion of the weight indicating means taken along viewing line 4—4 of FIG. 2.

Referring now to FIGS. 2, 3 and 4, the force transmitting means includes four levers 20 each of which extends from a respective corner peripheral portion 22 of the scale 10 to a common centrally located weight sensing portion 24. The levers 20 are disposed in a common horizontal plane. At its outer end, each lever 20 has a first V-shaped bearing surface 28 integrally formed thereon and projecting downwardly to make essentially line contact with a complementary horizontal, planar bearing surface 30 on the base 12. Spaced inwardly a short distance along the lever 20 is a second similar upwardly facing V-shaped bearing surface 32 which makes line contact with a similar horizontal, flat bearing surface 34 on the platform 14. At its inner end, each lever 20 has a downwardly facing cup-shaped formed bearing surface 36 which contacts a respective ball 38. The four balls 38 are interposed between the portions 36 of the four respective levers 20 and a thrust bearing member 40 secured to a pin 26. As best shown by FIG. 3, a cage plate 42 is secured to the pin 26 above the balls 38 and the formed bearing surfaces 36 to hold the elements in their assembled positions. An appropriate circumferential ring (not shown) surrounds the balls 38 to prevent radial movement of the balls out of their assembled positions. The purpose of the balls 38 is to transmit to the thrust bearing member 40 and the pin 26 a summation of the vertically downwardly forces exerted on the balls 38 by the levers 20.

The pin 26 is maintained in a fixed position by a support element 27 secured to the base member 12. Since the position of the pin 26 is fixed relative to the base 12, the inner ends of the levers 20 are also located in a fixed position relative to the base member 12.

Still referring to FIGS. 2, 3 and 4, a compression spring 50 is provided between each of the levers 20 and the platform 14, the springs 50 being located slightly inwardly of the mating bearing surfaces 32 and 34. The springs 50 bias the platform 14 upwardly relative to the levers 20 and the base 12 and, as hereinafter described, exert a preload force on the weight sensing apparatus.

When no weight is applied to the platform 14, the total force exerted by the springs 50 is sufficient to lift the bearing surfaces 34 off of the mating surfaces 32. In this manner, the spacing between the base and platform member, as at 18, is increased to a maximum value established by contact between stop members 52 and 54 carried by, respectively, the base 12 and the platform 14. This added spacing is utilized when a weight is not being applied to the platform 14 to turn off the electrical circuitry of the scale 10. More particularly, as shown by FIG. 2, the electrical circuitry includes a spring contact element 56 and a mating contact element 58 located vertically below the contact 56. The spring characteristics of the contact element 56 are such that it normally biases itself upwardly in a direction to break contact with element 58. When a weight is not being applied to the scale, the spacing between the base and the platform is sufficient to permit the element 56 to break electric contact with the element 58, thus preventing the flow of electric current from batteries located in a battery compartment 60 shown by FIG. 3. Whenever weight is applied to the platform 14, the force produced by the springs 50 is readily overcome, and the added spacing between the base and platform members provided by the springs 50 is eliminated. This significant reduction in the spacing between the base and platform members results in contact between the underside of the platform 14 and the element 56 and sufficient movement downwardly by the element 56 to contact element 58, thus closing the electric circuit. In this manner, the electric circuit is energized only when a weight is applied to the upper surface of the platform 14. It will thus be seen that the force exerted by the springs 50 must be large enough to lift the platform 14 and de-energize the scale mechanism when no weight is being applied, but small enough to permit the added spacing to be eliminated whenever a weight is placed upon the platform member 14. The spring constant of the springs 50 is such that the springs 50 exert substantially constant forces on the levers 20 at all times.

The force transmitting means also includes a multi-string force transmitting and weight sensing system indicated generally by the numeral 70 in FIG. 2. This multi-string system is fixed to the base member 12, and it includes an anchor member 72 having a recessed bearing surface 74 therein which received the pointed lower end 76 of the pin 26. During the weighing process, the pin 26 exerts a downwardly directed force on the anchor member 72, and the anchor member 72 exerts an equal upwardly directed force on the pin 26.

The total force applied to the upper face of the platform 14 will be transmitted downwardly through the four horizontal, planar bearing surfaces 34 to the bearing surfaces 32 of the levers 20. Normally, the total force will be equally divided between the levers 20, but in the event of an unbalanced loading on the platform, the forces applied to the individual levers 20 may be unequal. Nevertheless, the total force applied to the four bearing surfaces 32 will be equal to the downward force applied to the platform 14. Under loading, each of the levers 20 will assume an equilibrium position in which the total downward force applied to the bearing surface 32 by the bearing surface 34 and to the lever 20 by the spring 50 is equal to the total of the upward forces exerted on the lever 20 by the horizontal, planar bearing surface 30 and the associated ball 38 at the cup-shaped bearing surface 36. In addition, the total counterclockwise moment exerted on the lever 20 about the bearing surface 32 by the upward force at bearing surface 30 and the downward force from spring 50 is equal to the clockwise moment exerted on the lever 20 about the bearing surface 32 by the upward force at the ball 38. Since the moment arm between the ball 38 and the bearing surface 32 is much greater than the moment arm between the bearing surfaces 30 and 32 and the force exerted by the spring 50 is relatively slight, the force transmitted through the ball 38 to the pin 26 and the anchor 72 is substantially less than the force at bearing surface 30 and much less than the downward force applied to the bearing surface 32. Since the moment arms are fixed, it will be obvious that the force transmitted to the anchor 72 is a fixed percentage, say fifteen percent (15%), of the downward force applied to the bearing surface 32. Furthermore, since the levers 20 and their supports are substantially identical, the same fixed percentage of the total force applied to the platform 14 will be transmitted through the interconnecting means 24 to the anchor 72. The downward force applied to the anchor 72 is thus related in a predetermined and known manner to the total force applied to the platform 14.

In accordance with the invention and with particular reference to FIGS. 2 and 4, levers 20 are fabricated of sheet steel stock stamped to form the V-shaped projections comprising the bearing surfaces 28 and 32 and the cup-shaped bearing surface 36. These bearing surfaces are located in a substantially common plane so as to minimize force components on the levers 20. In a preferred embodiment of the invention, each of the levers 20 has a length "$d_1$" of approximately 6.275 inches between the cup-shaped bearing surfaces 36 and the bearing surface 28. The spacing "$d_2$" between the line contact regions of the bearing surfaces 28 and 32 is approximately 0.810 inches. In actual practice, the forming operation cannot provide absolutely accurate spacing between the various bearing surfaces, and reasonable tolerances in the spacings are to be expected. In particular, normal manufacturing tolerances in the range of plus or minus 0.003 inches and 0.005 inches are to be expected in the distances "$d_1$" and "$d_2$", respectively. Such tolerances are relatively easy to maintain at reasonable manufacturing cost levels since the spacings are all produced on a single piece of material by a single tool in a single manufacturing operation.

Figure 5:
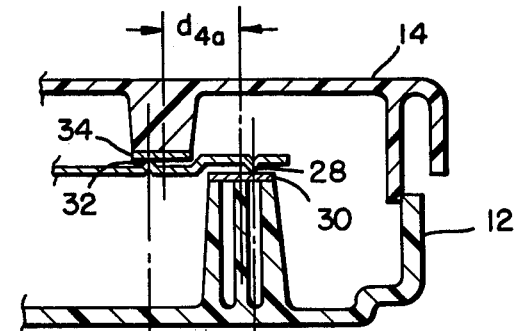
FIGS. 5 and 6 are views of the outer end of the lever of FIG. 4 illustrating how component misalignments and build-up of tolerances can be accommodated by the invention.
Figure 6:
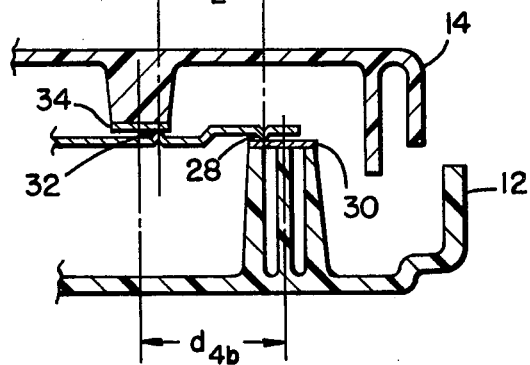

As illustrated by FIG. 4, each pair of planar bearing surfaces 30 and 34 are spaced apart by a distance "$d_4$" that is roughly comparable to the spacing "$d_2$" between the mating surfaces 28 and 32. This spacing "$d_4$" is, however, much more difficult to maintain within close tolerance limits since surface 30 is located on the base member 12 while surface 34 is located on the platform member 14. As a result, the actual spacing between the surfaces 30 and 34 may vary significantly from the ideal spacing since there can be a build-up of tolerances which can result in substantially reduced spacing "$d_{4a}$" as shown by FIG. 5 or a substantially increased spacing "$d_{4b}$" as shown by FIG. 6. Moreover, the spacings between pairs of surfaces 30 and 34 in a single scale may vary significantly with some spacings being greater than the ideal while other spacings are less than the ideal.

As indicated previously, the inner ends and bearing surfaces 36 of the levers 20 are maintained in a fixed position relative to the base member 12 by the support 27, the pin 26 and the associated balls 38. As a result, any misalignments or build-ups of tolerances between the scale components will be manifested as shown by FIGS. 5 and 6 in misalignment between the bearing surfaces 28 and 32 of the levers 20 and the mating surfaces 30 and 34 of the base and platform members, respectively. To accomodate such misalignments, the surface areas of the planar bearing surfaces 30 and 34 are made large relative to the surfaces 28 and 32 so that the maximum expected misalignment can occur without shifting the V-shaped bearing surfaces 28 and 32 out of engagement with the mating surfaces 30 and 34. Since the bearing surfaces 30 and 34 are flat over their entire surface area, misalignments as illustrated by FIGS. 5 and 6 do not have any affect on weighing accuracy since the moment arms are established only by the spacings "$d_2$" and "$d_3$" between the bearing surfaces of the lever 20. As discussed previously, these spacings are fixed within normal manufacturing tolerances, which are quite small since the entire lever 20 is formed by a single tool in a single manufacturing operation.

The multi-string force transmitting and weight sensing system 70 will now be described briefly with reference to FIG. 2. For a more complete description, reference may be made to co-pending patent application Ser. No. 06/382,155 for "Weighing Scale", filed on May 26, 1982, by Robert L. Boyles, and assigned to General Electric Company (6HW-5797). A support member 80 is secured to the base member 12 such that the support plate 80 effectively becomes an integral part of the base. A fixed anchor 85 is secured to the base plate 80. The anchor 72 is flexibly secured to the base plate 80 by a flexible mounting arrangement.

A single piece of piano wire 95 or the like is wrapped around the anchor 85 with the opposite ends of the wire clamped to the anchor 72. The wire 95 effectively forms a pair of laterally spaced-apart parallel strings secured at opposite ends thereof to the anchors 72 and 85. The wrapping of the wire 95 around the anchor 85 assures that the wire portions will operate as independent strings each having a free length equal to the distance between the anchors 72 and 85. Tensile stress in the wire 95 is uniformly distributed between the strings since the wire 95 is merely looped around the anchor 85. The wire 95 can slip relative to the anchor 85 as needed to equalize stress in the two strings.

In actual practice, the anchor 72 has preload forces applied thereto for the purpose of causing rotation of the anchor 72 to produce an initial tensile stress level in the strings. Through adjustment of an adjusting knob 130, the total amount of preload force on the anchor 72 can be varied to adjust the amount of preload tensile stress in the strings. A predetermined tensile load on the strings corresponds to a zero applied weight; the knob 130 can be manually adjusted to provide the required zero-setting preload force on the strings.

When a weight is applied to the platform 14, a force directly proportional to the weight is transmitted to the anchor 72 through the pin 26. This causes further movement of the anchor 72 and a directly proportional increase in the total force exerted on the anchor 72 by the strings. The increase in the moment on the anchor 72 produced by the strings is substantially equal to the moment produced by the applied weight acting through the pin 26. Because of the fixed moment arms, a weight applied to the platform 14 thus causes a directly proportional increase in the tension force exerted on the anchor by the strings. Stated differently, the tension force applied to the strings increases by an amount directly proportional to the weight applied to the platform 14.

It is a well-known principle that the natural, or resonant, frequency of a stressed string is related to the tensile stress of the string. The natural frequency increases with increases in the tension force on the string.

As illustrated by FIG. 2, the parallel strings are laterally spaced apart by a distance that is large relatively to the thickness of the individual strings. At their longitudinal center, the strings are clamped together by a cross member 162, which extends transversely of the strings across the tops of a pair of coils 164 and 166 located on opposite sides of the strings. A pair of permanent magnets (not shown) each depend from an end of the cross member 162 in alignment with the core of the respective coil 164 and 166. One of the magnets has its south pole adjacent the respective coil while the other magnet has its north pole adjacent the respective coil. The coils 164 and 166 are coupled by appropriate connections (not shown) to the scale control circuitry indicated at 180. The circuitry 180 includes electronic components which together with the coils 164 and 166 comprise a resonant feedback oscillator having one of the coils in the input circuit and the other coil in the output circuit.

Under the influence of the control circuitry 180, the multi-string unit will be driven by the oscillator circuitry in a torsional mode about an axis centered between the strings with the end of the cross member 162 and the magnets alternately approaching and retreating from the associated coils 164 and 166. The feedback circuitry of the scale will cause the multi-string unit to vibrate at a resonant or natural frequency established by the physical characteristics of the system, including the total tension force on the strings, the physical characteristics of the wire 94 such as material, construction, etc., the spacing between the strings, the length of the strings, and the moment of inertia of the system as determined primarily by the cross member 162 and the magnets. An adjusting bar 178 is provided in order to adjust the moment of inertia. At the time of manufacture, the bar 178 may be adjusted to establish a desired natural frequency at a given preload force on the strings. Thereafter, all physical characteristics of the system, except applied force, will remain substantially fixed. As a result, changes in the natural frequency are applicable only to changes in the applied tension force.

The electronic circuitry 180 includes means for sensing the frequency of oscillation and converting the sensed frequency into a signal driving the digital display 16. Various forms of microprocessing circuitry are well-known in the art for accomplishing this function.

The bearing arrangement of this invention provides a weighing scale in which significant misalignments of parts can occur without adversely affecting operation and weighing accuracy. The base and platform members need not be accurately aligned, and they can be manufactured to relatively low tolerance levels since there is no requirement that the bearing surfaces be accurately aligned.

While the invention has been particularly shown and described with reference to a preferred embodiment thereof, it will be understood by those skilled in the art that various changes in form, detail, and application may be made therein without departure from the spirit and scope of the invention. Accordingly, it is intended that all such modifications and changes be included within the scope of the appended claims.

What is claimed as new and is desired to obtain by Letters Patent of the United States is:

1. In a weighing scale, apparatus comprising:
   a generally horizontal base member,
   a generally horizontal platform member overlying said base member in vertically spaced-apart relation thereto,
   force transmitting means interposed between said base and platform members for transmitting force therebetween, said force transmitting means comprising:
   an upwardly facing horizontal planar bearing surface on said base member,
   a downwardly facing horizontal planar bearing surface on said platform member,
   a lever between said horizontal planar bearing surfaces on said base and platform members, said lever including first and second bearing surfaces projecting vertically therefrom into contact with said horizontal planar bearing surfaces of said base member and said platform member, respectively,
   said first and second bearing surfaces being horizontally spaced-apart by a distance fixed within normal manufacturing tolerances, and said horizontal planar surfaces of said base platform members being horizontally spaced-apart by a distance roughly comparable to the spacing between said first and second bearing surfaces,
   and the surface areas of said horizontal planar bearing surfaces being large relative to the contacting surface area of said first and second bearing surfaces,
   whereby significant horizontal misalignment of said base and platform members and said horizontal planar bearing surfaces can be accommodated without affect on the forces and moments transmitted by said lever.

2. Apparatus as defined by claim 1 in which said first and second bearing surfaces are V-shaped projections providing essentially line-contact between each of said first and second bearing surfaces and the respective one of said horizontal planar bearing surfaces.

3. In a weighing scale, apparatus comprising:
   a generally horizontal base member,
   a generally horizontal platform member overlying said base member in vertically spaced-apart relation thereto,
   force transmitting means interposed between said base and platform members for transmitting force therebetween, said force transmitting means comprising:
   a plurality of upwardly facing horizontal planar bearing surfaces on said base member,
   an equal plurality of downwardly facing horizontal planar bearing surfaces on said platform member each associated with a respective one of said plurality of horizontal planar bearing surfaces on said base member,
   an equal plurality of levers each positioned between a respective pair of said horizontal planar bearing surfaces, each of said levers including first and second bearing surfaces projecting vertically therefrom into contact with said associated horizontral planar bearing surfaces of said base member and said platform member, respectively,
   said first and second bearing surfaces of each of said levers being horizontally spaced-apart by a distance fixed within normal manufacturing tolerances, and each of said pairs of horizontal planar surfaces of said base and platform members being horizontally spaced-apart by a distance roughly comparable to the spacing between said first and second bearing surfaces, and the surface areas of said horizontal planar bearing surfaces being large relative to the contacting surface area of said first and second bearing surfaces, whereby significant horizontal misalignment of said base and platform members and said horizontal planar bearing surfaces can be accommodated without affect on the forces and moments transmitted by said lever.

4. Apparatus as defined by claim 3 in which said levers are each disposed in a generally horizontal plane, and in which said levers are joined together to operate in unison.

5. A weighing scale apparatus including apparatus as defined by claim 3 in which said force transmitting means further comprises weight sensing means for converting a total force applied thereto into an indication of the weight applied to the scale, each of said levers comprising an elongated member disposed in a generally horizontal plane with said first and second bearing surfaces of said lever being located adjacent one end thereof, and said lever including a third bearing surface adjacent the other end thereof for transmitting force to said weight sensing means in response to forces applied to said first and second bearing surfaces as a result of a weight being applied to said platform member, said third bearing surface being spaced-apart from said first and second bearing surfaces by a distance fixed within normal manufacturing tolerances such that the force applied to said weight sensing means will be related in a known manner to the forces transmitted to said first and second bearing surfaces.

6. A weighing scale apparatus as defined by claim 5 in which each of said levers extends from a separate peripheral portion of said overlying base and platform members to a common central portion thereof, said third bearing surfaces being located at said central portion and said third bearing surfaces transmitting to said weight sensing means a total force related in a known manner to the total weight applied to said platform member.

7. A weighing scale apparatus as defined by claim 5 in which said weight sensing means is secured to a selected one of said base and platform members in a fixed location relative thereto, and in which said third bearing surfaces are located horizontally in a fixed position relative to said weight sensing means, whereby the positioning of said first and second bearing surfaces relative to said base and platform members may vary without affecting the forces and moments transmitted by said levers.

8. A weighing scale apparatus as defined by claim 7 in which said first and second bearing surfaces are V-shaped projections providing essentially line-contact between each of said first and second bearing surfaces and the respective one of said horizontal planar bearing surfaces.

* * * * *